United States Patent
Kasuga

(10) Patent No.: US 8,464,652 B2
(45) Date of Patent: Jun. 18, 2013

(54) FILM FORMING APPARATUS AND METHOD OF FORMING FILM

(75) Inventor: Osamu Kasuga, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 539 days.

(21) Appl. No.: 12/757,633

(22) Filed: Apr. 9, 2010

(65) Prior Publication Data

US 2010/0266777 A1 Oct. 21, 2010

(30) Foreign Application Priority Data

Apr. 20, 2009 (JP) ................................. 2009-101655

(51) Int. Cl.
*B05C 5/02* (2006.01)
*B41J 2/165* (2006.01)

(52) U.S. Cl.
USPC .................. 118/300; 118/302; 347/1; 347/17

(58) Field of Classification Search
USPC .......... 118/300, 52, 56, 319, 302, 666; 347/1, 347/22, 33, 8, 29, 17; 427/240
See application file for complete search history.

(56) References Cited

U.S. PATENT DOCUMENTS

| | | | | |
|---|---|---|---|---|
| 5,580,607 A | * | 12/1996 | Takekuma et al. | 427/240 |
| 6,682,777 B2 | * | 1/2004 | Omori | 427/240 |
| 2009/0295858 A1 | | 12/2009 | Ito et al. | |
| 2009/0303274 A1 | | 12/2009 | Iwata et al. | |
| 2009/0303275 A1 | | 12/2009 | Ito et al. | |

FOREIGN PATENT DOCUMENTS

| | | |
|---|---|---|
| JP | 2004-167431 A | 6/2004 |
| JP | 2005-146768 A | 6/2005 |
| JP | 2009-0006212 A | 1/2009 |
| JP | 2009-183866 A | 8/2009 |
| JP | 2009-285546 A | 12/2009 |
| JP | 2009-288278 A | 12/2009 |
| JP | 2009-291757 A | 12/2009 |
| JP | 2009-294350 A | 12/2009 |

\* cited by examiner

*Primary Examiner* — Laura Edwards
(74) *Attorney, Agent, or Firm* — Global IP Counselors, LLP

(57) ABSTRACT

A temperature adjustment unit is provided to a chamber for accommodating a stage, a discharge head, and a maintenance device. The temperature adjustment unit adjusts the temperature of the maintenance area at least while the transport device has the discharge head positioned in the maintenance area to be equal to or greater than the temperature of the drawing area while the transport device has the discharge head positioned in the drawing area.

8 Claims, 7 Drawing Sheets

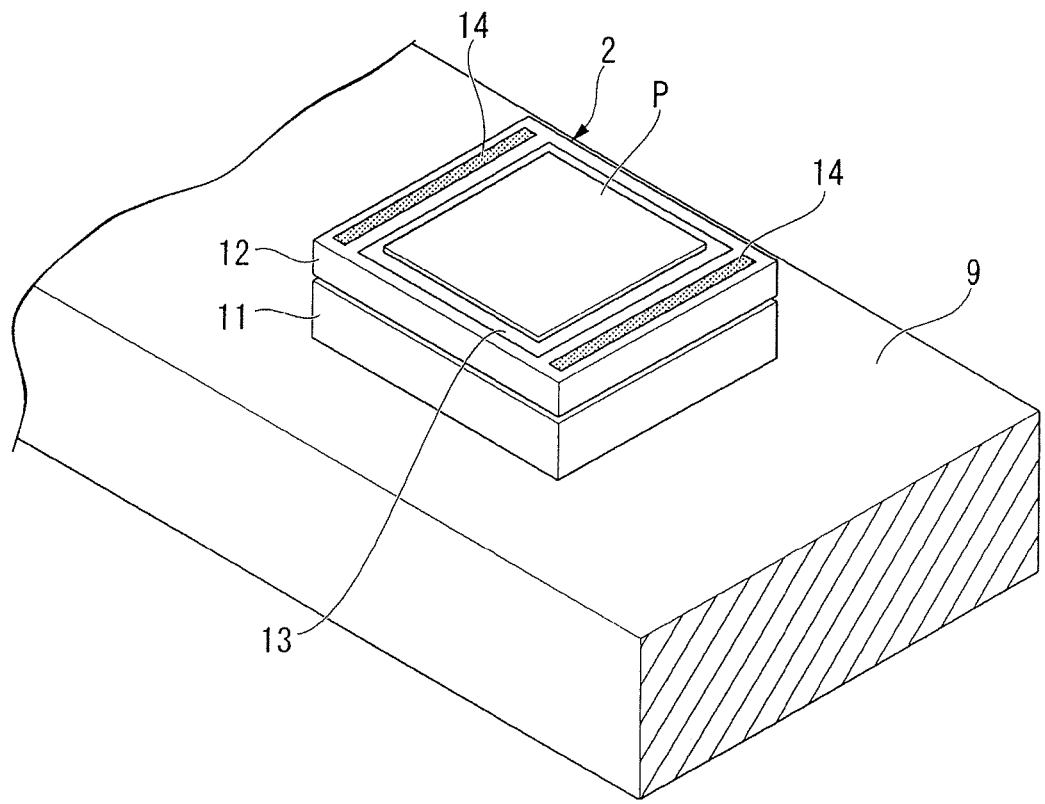
F I G. 3
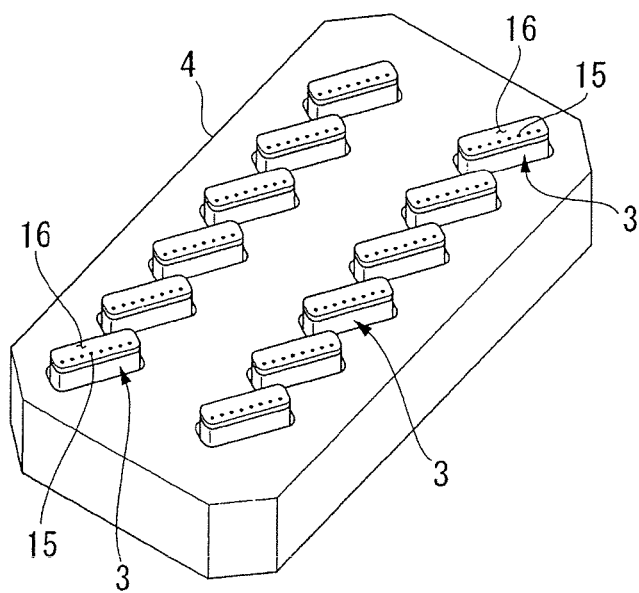
F I G. 4

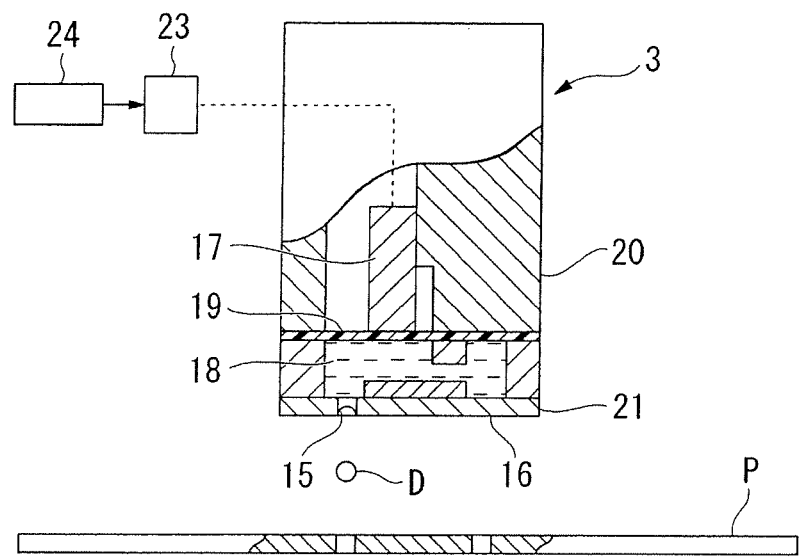
F I G. 5
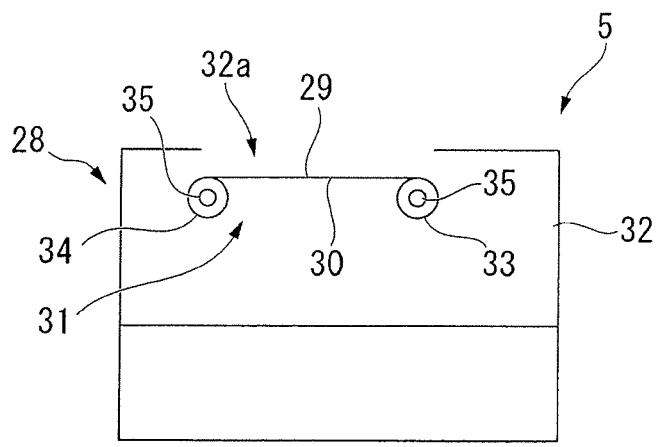
F I G. 6

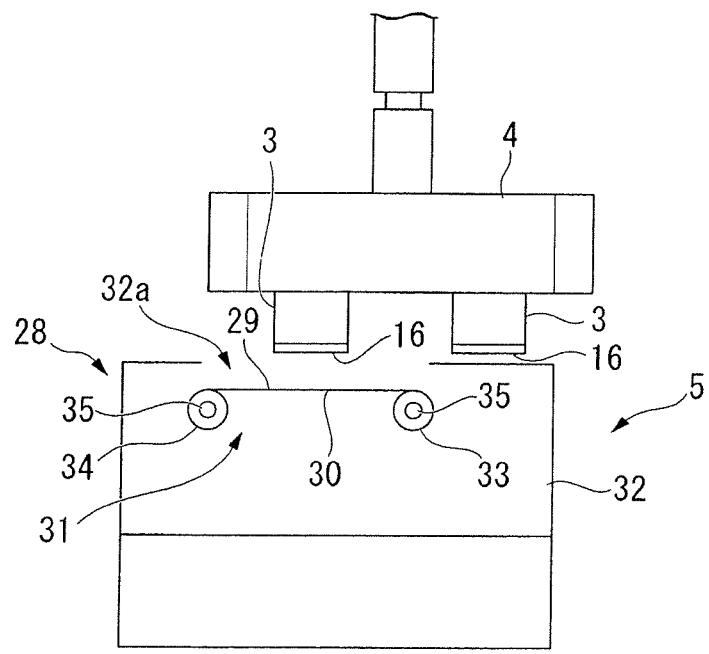
F I G. 7
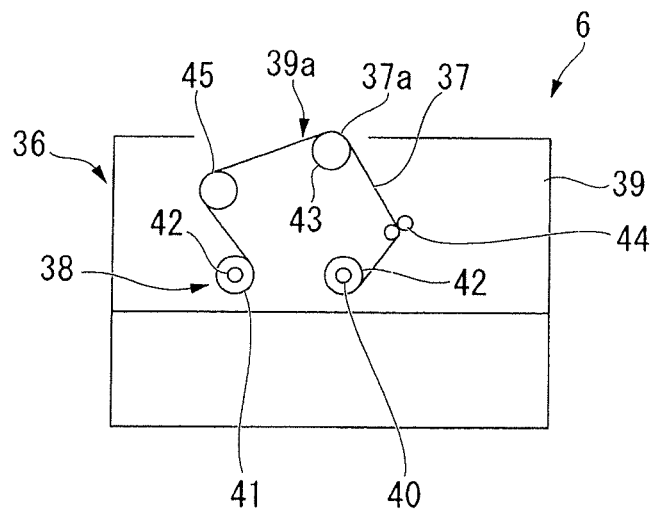
F I G. 8

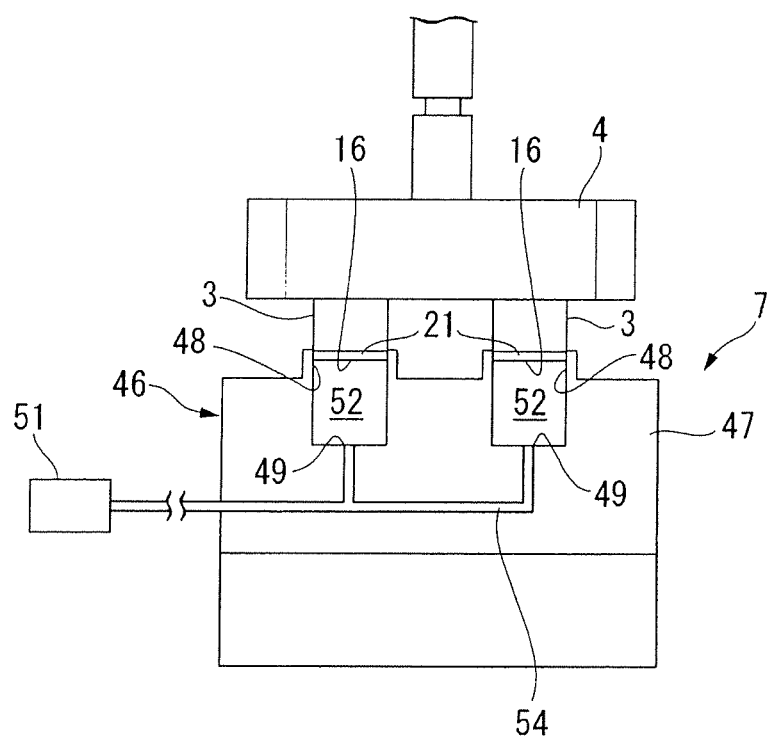
F I G. 11

FILM FORMING APPARATUS AND METHOD OF FORMING FILM

CROSS-REFERENCE TO RELATED APPLICATIONS

The entire disclosure of Japanese Patent Application No. 2009-101655, filed Apr. 20, 2009 is expressly incorporated by reference herein.

BACKGROUND

1. Technical Field

The present invention relates to a film-forming apparatus and a method of forming film.

2. Related Art

Conventionally, spin coating or flexographic printing is commonly used as a method for forming a color filter or another functional thin film on a substrate. In contrast, in recent years, droplet discharging is used for forming various thin films because the method is effective for reducing ink consumption and the number of production steps. With the method for forming a thin film using the droplet discharge method, ink in which functional material (solid content) is dissolved or dispersed in a solvent (dispersion medium) is discharged onto the substrate as droplets and arranged in desired positions, whereupon the ink thus arranged is dried to remove the solvent (dispersion medium) in the ink and thereby form a thin film composed of the functional material.

Color filters, wiring, or other industrially formed functional thin films are becoming increasingly downscaled and made smaller in recent years. Therefore, higher discharge precision is required when these functional thin films are formed using the droplet discharge method. Based on this background, discharge precision has been improved in recent years by using a chamber to accommodate discharge heads for discharging droplets and controlling the discharge head environment, such as Japanese Laid-open Patent Application Nos. 2004-167431 and 2005-146768.

With a film-forming apparatus in which the discharge heads are so accommodated inside a chamber, there is variability in the ink discharge amount, ink deposition accuracy is reduced, and there are other problems in that the ink begins to dry and viscosity is increased in nozzles that do not perform a discharge operation among the plurality of nozzles provided to the nozzle surface, for example, because the nozzle surface of the discharge heads is in a state exposed to atmosphere inside the chamber.

In view of the above, with such a film-forming apparatus, maintenance processing must be carried out on a regular basis in order to maintain or restore a good discharge state for droplets discharged from the nozzles. Specific operations that are carried out include a flushing operation for discharging ink from the nozzles so that the viscosity of the ink does not increase; a suction operation for removing higher viscosity ink from inside the nozzles and removing foam from inside the cavities by mounting a cap on the nozzle surface (capping) and performing suctioning via the cap; and a wiping operation for removing deposits adhering to the nozzle surface, by wiping the nozzle surface with a wiping member. Such a maintenance process is ordinarily carried out in a maintenance area that is provided separately from the drawing area for forming a film by discharging ink (functional liquid) onto a substrate.

However, the film-forming apparatus described above has the following problems that need to be improved.

The discharge heads used in the film-forming apparatus and the control device provided with an electronic circuit for applying an electric signal (drive signal) to the discharge heads both undergo self-heating during operation. The control device is ordinarily arranged near the discharge heads. Therefore, the temperature of the discharge heads becomes greater than the ambient temperature (atmospheric temperature) due to the heat produced by the discharge heads and by the heat produced by the control device, and the temperature of the members near the discharge heads also becomes greater than the ambient temperature.

However, the piezoelectric elements (e.g., piezoelements) that act as drive elements of the discharge heads have temperature characteristics, and the Vh displacement characteristics and the like fluctuate in accompaniment with temperature changes, and the discharge amount therefore fluctuates due to changes in the ambient temperature. The viscosity of the ink inside the discharge heads fluctuates in accordance with the temperature, and this also causes the discharge amount of fluctuate. Therefore, when the discharge heads move to the maintenance area in order to carry out maintenance after discharging (drawing) in the drawing area, the temperature of the discharge heads is reduced because the discharge heads are not producing heat and the heat of the control device is not present. When the discharge heads return to the drawing area and perform a discharge (drawing), variability occurs between initial discharges and later discharges.

Specifically, when the discharge heads move to the maintenance area to perform maintenance, the discharge heads stop producing heat and the temperature of the discharge heads is reduced when the driving of the drive elements of the discharge heads is stopped in the case, for example, that the nozzle surface is capped and a suction operation is carried out. Therefore, when the discharge heads are thereafter moved again to the drawing area and discharging (drawing) is immediately performed, discharge variability occurs as described above until the discharge heads having a lower temperature again warm up to an optimum temperature.

In view of the above, rather than immediately carrying out discharging (drawing) when the discharge heads have been moved again to the drawing area following maintenance, it is possible to consider waiting until the discharge heads warm up to the ambient temperature of the drawing area and then carry out a discharge (drawing) operation. However, in such a case, a new problem arises in that productivity is compromised because of the wait time.

SUMMARY

The present invention was contrived in view of these circumstances, and an object thereof is to provide a film-forming apparatus and a method of forming a film in which discharge variability due to temperature differences in the discharge heads is prevented without a loss in productivity due to wait time.

A film-forming apparatus according to a first aspect of the present invention is characterized in comprising a stage for mounting a substrate; a discharge head having a nozzle surface provided with a plurality of nozzles and used for discharging droplets of a functional liquid from nozzles provided to the nozzle surface; a maintenance device for performing maintenance of the discharge head; and a chamber for accommodating the stage, the discharge head, and the maintenance device, wherein a drawing area for arranging the stage, a maintenance area for arranging the maintenance device, and a transport device for moving the discharge head between the drawing area and the maintenance area are provided inside the chamber; and temperature adjustment unit is provided to the chamber in order to adjust the temperature of the maintenance area at least while the transport device has the discharge head positioned in the maintenance area so that the temperature is equal to or greater than the temperature of the drawing area while the transport device has the discharge head positioned in the drawing area.

The film-forming apparatus according to a second aspect of the present invention is characterized in comprising a discharge head for discharging droplets of a functional liquid from nozzles; a maintenance device for performing maintenance of the discharge head; a chamber having a drawing area for discharging droplets on a substrate using the discharge head, and a maintenance area for performing maintenance of the discharge head using the maintenance device; a temperature adjustment unit for adjusting the temperature inside the chamber; and a transport device for moving the discharge head between the drawing area and the maintenance area, wherein the temperature adjustment unit adjusts the temperature of the maintenance area while the transport device has the discharge head positioned in the maintenance area, so as to be equal to or greater than the temperature of the drawing area while the transport device has the discharge head positioned in the drawing area.

In accordance with this film-forming apparatus, a temperature adjustment unit is provided for adjusting the temperature of the maintenance area at least while the discharge head is positioned in the maintenance area, so as to be equal to or greater than the temperature of the drawing area the discharge head is positioned in the drawing area. Therefore, discharge variability can be reduced between the initial and subsequent discharges, even when the discharge head is moved to the maintenance area to undergo maintenance and is thereafter returned to the drawing area to immediately carry out discharging (drawing). In other words, the temperature adjustment unit sets the maintenance area to a desired temperature that is equal to or greater than the temperature of the drawing area, whereby temperature loss by the discharge head can be suppressed while the discharge head is moved to the maintenance area to undergo maintenance. As a result, good discharge can be carried out and a film can be formed without the occurrence of discharge variability due to temperature changes and without waiting for the discharge head to reach a desired temperature because the temperature of the discharge head is kept at a desired temperature even when the discharge head is returned to the drawing area.

In the film-forming apparatus described above, a partition shutter may be openably/closeably disposed between the drawing area and the maintenance area.

Such a configuration makes it possible for the temperature adjustment unit to adjust and hold the temperature of the maintenance area in particular at a desired temperature by using a partition shutter to partition the maintenance area and the drawing area in the case that the temperature of the maintenance area is greater than the temperature of the drawing.

In the film-forming apparatus described above, the temperature adjustment unit may comprise an air-conditioning device provided to the chamber.

Such a configuration makes it possible to more adequately adjust the temperature of the maintenance area.

In the film-forming apparatus described above, the temperature adjustment unit may be formed by having the control device for controlling the driving of the discharge head arranged in the maintenance area.

The control device emits heat during operation because the control device provided with an electronic circuit for applying electric signals (drive signals) to the discharge head. Therefore, the temperature of the maintenance area can be increased to a desired temperature that is equal to or greater than the temperature of the drawing area by arranging the control device in the maintenance area. It is possible to save energy by making effective use of the heat generated by the control device.

In the film-forming apparatus described above, the temperature adjustment unit is formed by having the drive source of the transport device arranged in the maintenance area.

The motor or other drive source of the transport device also produces heat during operation. Therefore, the temperature of the maintenance area can be increased to a desired temperature that is equal to or greater than the temperature of the drawing area by arranging the drive source in the maintenance area. It is possible to save energy by making effective use of the heat generated by the drive source.

In the film-forming apparatus described above, the maintenance device may be provided with a capping unit for mounting a cap on the nozzle surface of the discharge head.

In the case that the cap is to be mounted on the head surface of the discharge head by the capping unit and a suction operation is to be carried out, the discharge head stops producing heat when the driving of the drive elements of the discharge head is stopped. However, the temperature adjustment unit sets the maintenance area is set to a desired temperature, whereby temperature loss by the discharge head can be suppressed and discharge variability caused by temperature change can be prevented.

The method of forming a film according to another aspect of the present invention comprises using a film-forming apparatus to discharge droplets of a functional liquid from a discharge head onto a substrate to form a film on the substrate, the film-forming apparatus having the discharge head; a stage used for mounting a substrate; a maintenance device for performing maintenance of the discharge head; and a chamber for accommodating the stage, the discharge head, and the maintenance device; the discharge head having a nozzle surface provided with a plurality of nozzles and discharging droplets of the functional liquid from nozzles provided to the nozzle surface; and the chamber interior provided with a drawing area for arranging the stage, a maintenance area for arranging the maintenance device, and a transport device for moving the discharge head between the drawing area and the maintenance area; wherein the temperature of the maintenance area at least in the period when the transport device has the discharge head positioned in the maintenance area is adjusted so as to be equal to or greater than the temperature of the drawing area while the transport device has the discharge head positioned in the drawing area.

In accordance with this method for forming a film, the temperature of the maintenance area is adjusted at least while the discharge head is positioned in the maintenance area, so as to be equal to or greater than the temperature of the drawing area the discharge head is positioned in the drawing area. Therefore, discharge variability can be reduced between initial discharge and subsequent discharges, even when the discharge head is moved to the maintenance area to undergo maintenance and is thereafter returned to the drawing area to immediately carry out discharging (drawing). In other words, the temperature of the maintenance area is set to a desired temperature that is equal to or greater than the temperature of the drawing area, whereby temperature loss by the discharge head can be suppressed while the discharge head is moved to the maintenance area to undergo maintenance. As a result, good discharge can be carried out and a film can be formed without the occurrence of discharge variability due to temperature changes and without waiting for the discharge head to reach a desired temperature because the temperature of the discharge head is kept at a desired temperature even when the discharge head is returned to the drawing area.

BRIEF DESCRIPTION OF THE DRAWINGS

FIG. 3 is a perspective view showing the schematic structure of the stage;

FIG. 4 is a perspective view of the plurality of discharge heads held by a carriage as view from below;

FIG. 5 is a lateral sectional view for illustrating an example of the structure of the discharge head;

FIG. 6 is a diagram for illustrating the deposit accuracy measurement unit;

FIG. 7 is a diagram for illustrating the method for using the deposit accuracy measurement unit;

FIG. 8 is a diagram for illustrating the wiping unit;

FIG. 11 is a diagram for illustrating the method for using the capping unit.

DETAILED DESCRIPTION OF EXEMPLARY EMBODIMENTS

The present invention is described in detail below.

Figure 1:
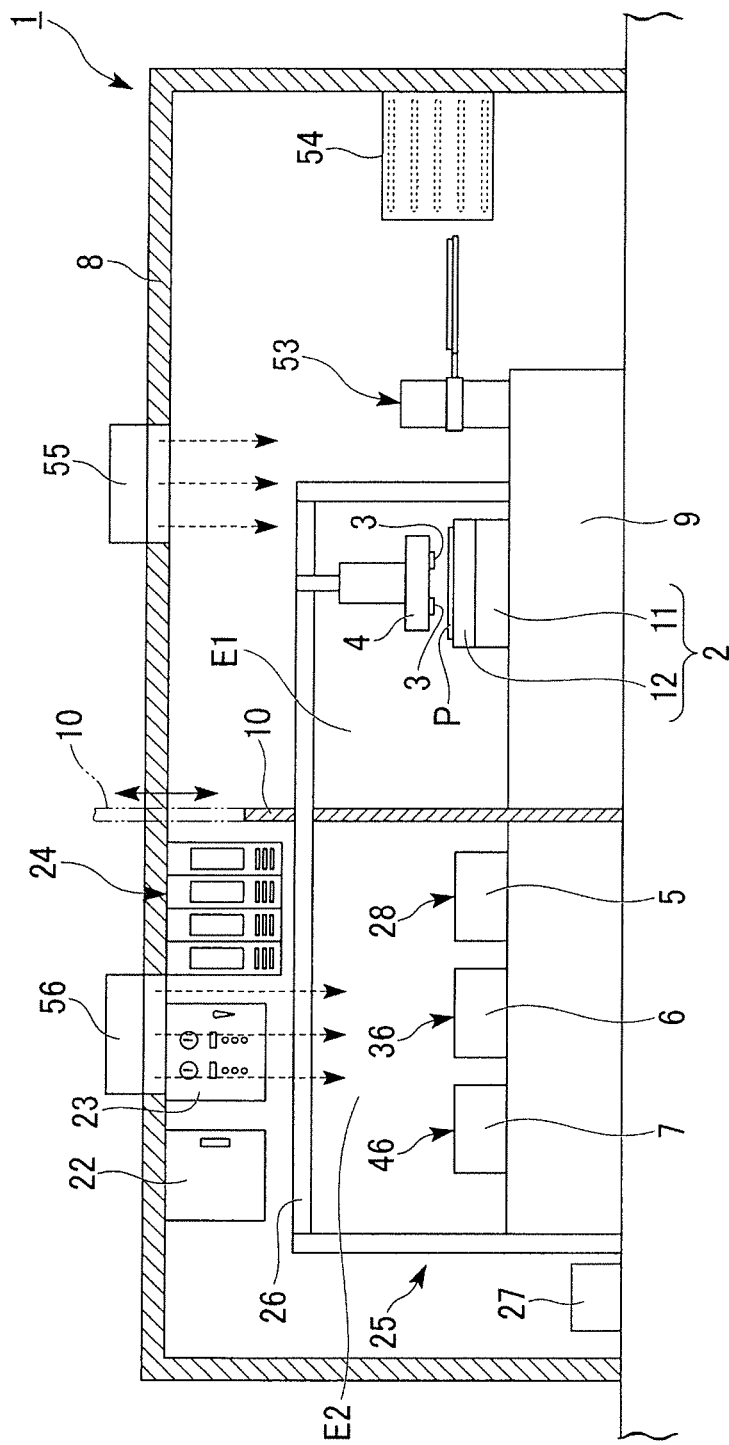
FIG. 1 is a lateral sectional view showing the schematic structure of the film-forming apparatus according to the present invention.
Figure 2:
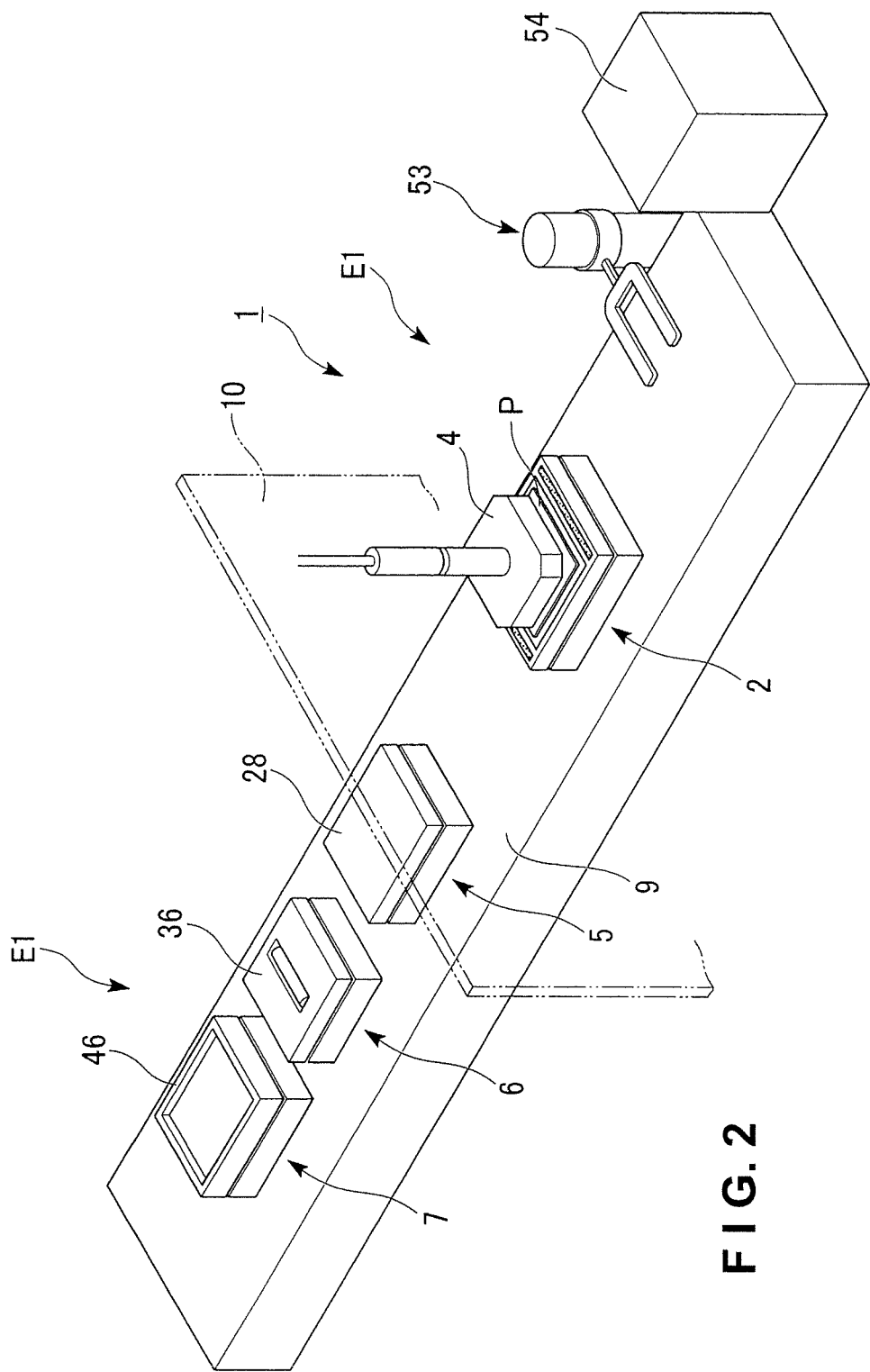
FIG. 2 is a perspective view showing the main part of an embodiment of the film-forming apparatus according to the present invention.

The film-forming apparatus of the present invention will be described first with reference to the drawings. The members shown in the drawings are of sufficient size to be recognized and each member is therefore illustrated with a varying scale. FIGS. 1 and 2 are schematic structural diagrams showing an embodiment of the film-forming apparatus of the present invention, and in the diagrams, reference numeral 1 is a film-forming apparatus. FIG. 1 is a lateral sectional view of the film-forming apparatus 1 according to the present embodiment, and FIG. 2 is a perspective view showing the main part of the film-forming apparatus 1 according to the present embodiment.

The film-forming apparatus 1 comprises, as shown in FIG. 1, a stage 2 for mounting a substrate P, a discharge head 3 having a nozzle surface (not shown) in which a plurality of nozzles (not shown) is formed and used for discharging droplets of a functional liquid from the nozzles provided to the nozzle surface, a carriage 4 for holding the discharge head 3, maintenance devices 5, 6, 7 for carrying out maintenance of the discharge head 3, and a chamber 8 for accommodating the stage 2, the discharge head 3, the carriage 4, and all of the maintenance devices 5, 6, 7. In the present embodiment, the film-forming apparatus 1 forms a color filter thin film on the substrate P by discharging droplets of a color filter material as a functional liquid. The stage 2, the maintenance devices 5, 6, 7 are all disposed on a rectangular parallelepiped-shaped platform 9 arranged inside the chamber 8.

In this film-forming apparatus 1, a drawing area E1 in which the stage 2 is arranged and a maintenance area E2 in which the maintenance devices 5, 6, 7 are arranged are provided inside the chamber 8. A partition shutter 10 is openably/closeably provided between the drawing area E1 and the maintenance area E2. The partition shutter 10 is configured so as to be lifted upward to thereby provide an opening between the drawing area E1 and the maintenance area E2, as shown by the chained line in FIG. 1, for example, and lowered from the lifted state to thereby partition the drawing area E1 and the maintenance area E2. An aperture (not shown) is formed in the partition shutter 10 in a state that avoids interference with a later-described transport rail of the carriage 4 and the platform 9.

The stage 2 comprises a secure section 11 disposed on the platform 9, and a movable section 12 movably provided on the secure section 11, as shown in FIG. 3, and is configured so that the movable section 12 is moved in, e.g., the +X direction and the −X direction on the secure section 11 by a motor or another drive source (not shown). A holding mechanism 13 for holding the substrate P on the upper surface of the movable section 12 is provided to the movable section. The holding mechanism 13 comprises a known mechanism for electrostatic chucking, vacuum chucking, or mechanically positioning and holding, and is used for detachably holding the substrate P in a predetermined position of the movable section 12.

A flushing area 14 is provided to the two sides of the location where the holding mechanism 13 is disposed, on the upper surface of the movable section 12. A porous member for absorbing droplets discharged from the nozzles of the discharge head 3 is disposed in the flushing area 14. A sponge-like member, for example, is used as the porous member. Based on this configuration, the discharge head 3 can be positioned above the flushing area 14 before and after discharging droplets onto the substrate P so that an operation for discharging droplets from the nozzles, i.e., a flushing operation, can be carried out.

A plurality of the discharge heads 3 (12 heads in FIG. 4) is provided to the lower surface side of the carriage 4, as shown in FIG. 4. A nozzle surface 16 in which nozzles 15 for discharging droplets of a functional liquid are formed is provided to the discharge heads 3. The nozzle surface 16 has a substantially rectangular shape in the present embodiment. A plurality of the nozzles 15 is formed in the nozzle surface 16 along a predetermined direction (the lengthwise direction of the nozzle surface 16).

When a predetermined drive signal is fed to a piezoelement (piezoelectric element) 17, the piezoelement 17 deforms and the pressure of a cavity 18 in which the functional liquid is stored fluctuates via a flexible vibration plate 19, as shown in FIG. 5, which is a cross-sectional view of the discharge head 3. The discharge head is a so-called electromechanical conversion-type discharge head in which droplets D of the functional liquid are discharged from the nozzles 15 due to the fluctuation in the pressure.

In other words, the discharge head 3 has a head main unit 20, and a nozzle plate 21 affixed to the lower end of the head main unit 20. Nozzles 15 are formed in the nozzle plate 21, and the lower surface of the nozzle plate is the nozzle surface 16. The nozzle surface 16 is arranged facing downward so as to face the substrate P arranged on the stage 2. The discharge head 3 has the cavity 18 (space) formed on the upper side of the nozzle plate 21, the vibration plate 19 arranged on the upper side of the cavity 18, and the piezoelement 17 formed above the vibration plate 19.

A plurality of the cavities 18 is formed so as to correspond to the plurality of nozzles 15. The cavities 18 are connected to a functional liquid storage section 22 shown in FIG. 1, via a flow passage (not shown) composed of flexible tube. The functional liquid (color filter material) is thereby fed from the functional liquid storage section 22 to the cavities 18 and then discharged via the nozzles 15.

The vibration plate 19 varies the volume of the cavity 18 by vibrating in the vertical direction, and the internal pressure is varied. A plurality of the piezoelements 17 is arranged in corresponding fashion to the plurality of nozzles 15, and discharge droplets D of the functional liquid are discharged from the nozzles 15 when the vibration plate 19 is made to vibrate based on a drive signal from a control device 23, causing the internal pressure of the cavities 18 to vary. The discharge head 3 having such a configuration self-heats when the piezoelements 17 in particular receive a drive signal and are driven (made to operate).

The control device 23 is electrically connected to the discharge head 3 and is provided with an electric circuit for applying an electric signal (drive signal) to the piezoelement 17 of the discharge head 3. Therefore, the control device 23 self-heats during operation. A controller 24 is electrically connected to the control device 23. The controller 24 functions as a power source of the control device 23 and is used for controlling the drive source (not shown) of a later-described transport device and the maintenance devices 5, 6, 7. Therefore, the controller 24 also self-heats during operation. As configured herein, the control device 23 and the controller 24 are both arranged in the maintenance area E2.

The carriage 4 provided with the discharge head 3 is moved along the lengthwise direction of the upper surface of the platform 9 by a transport device 25, as shown in FIG. 1. The transport device 25 comprises a beam-shaped rail 26 from which the carriage 4 is suspended, and a motor or other drive source 27 for moving the carriage 4 in a reciprocating fashion along the rail 26. A movable unit (not shown) disposed on the rail 26 is moved by the drive source 27 along the rail 26, the drive source 27 being arranged in the maintenance area E2. The movable unit movably holds the carriage 4, whereby the carriage 4 is moved along the rail 26. The drive source 27 self-heats during operation. The drive source 27 is electrically connected to the controller 24 and is operated by drive signals from the controller 24.

As configured herein, the rail 26 of the transport device 25 is arranged in continuous fashion from the drawing area E1 to the maintenance area E2, and the transport device 25 can thereby move the carriage 4 and the discharge head 3 provided to the carriage between the drawing area E1 and the maintenance area E2. Although not shown in the drawings, the carriage 4 is movably configured on the movable unit and the discharge head 3 can thereby be moved in relation to the substrate P on the stage 2. In other words, the discharge head 3 can be moved in a relative fashion in the X direction and the Y direction orthogonal to the X direction in relation to the substrate P on the stage 2 because of the movement (e.g., movement in the X direction) of the movable section 12 in relation to the secure section 11 on the stage 2 and the movement (e.g., movement in the Y direction) in relation to the moveable unit of the discharge head 3. Also, the discharge head can be elevated by an elevator mechanism in relation to the movable unit and can thereby be brought into contact with or moved away from the substrate P on the stage 2 and the later-described maintenance devices 5, 6, 7.

The maintenance device 5 has a deposit accuracy measurement unit 28, as shown in FIG. 6. The deposit accuracy measurement unit 28 measures the deposition accuracy of the droplets D discharged from the nozzles 15 of the discharge head 3, and has a stripe-shaped sheet member 30 having a recording surface 29 provided facing the nozzle surface 16 of the discharge head 3 and provided so as to allow movement in a relative fashion to the nozzle surface 16, a feed mechanism 31 for feeding the recording surface 29 of the sheet member 30, and a housing member 32 for accommodating the sheet member 30 and the feed mechanism 31.

At least a portion of the sheet member 30 is exposed inside an aperture 32a formed on the upper surface of the housing member 32 and can thereby be made to face the nozzle surface 16 of the discharge head 3. The sheet member 30 comprises a recording medium (measurement member) that can record the deposit position of droplets D discharged from the nozzles 15 of the discharge head 3, and roll paper, for example, or another recording paper is advantageously used.

The feed mechanism 31 comprises a feed reel 33 for feeding the sheet member 30, a take-up reel 34 for taking up the sheet member 30 fed from the feed reel 33, and rotating motor or another actuator 35 for causing the feed reel 33 and the take-up reel 34 to rotate. The feed mechanism 31 so configured is designed to feed the sheet member 30 from the feed reel 33 to the take-up reel 34 when the actuator 35 is driven and controlled by the controller 24.

In order for the deposit accuracy measurement unit 28 to measure the deposit accuracy of the droplets D discharged from the nozzles 15 of the discharge head 3, first, the transport device 25 is driven by the controller 24 and the carriage 4 is positioned above the deposit accuracy measurement unit 28 of the maintenance device 5. The nozzle surface 16 of the discharge head 3 is made to face the aperture 32a of the housing member 32 of the deposit accuracy measurement unit 28, as shown in FIG. 7.

Next, the control device 23 causes the discharge head 3 to perform a discharge operation, and droplets D are deposited on the recording surface 29 of the sheet member 30 exposed inside the aperture 32a. The deposit accuracy of the droplets D discharged from the nozzles 15 is thereafter measured from the deposit position of the droplets D recorded on the recording surface 29. The discharge accuracy of the discharge head 3 is checked based on the measurement results, and a thin film is formed on the substrate P if there is no abnormality. In the case of an abnormality, maintenance is carried out again by, e.g., the maintenance devices 6, 7 described below.

The mounting surface 6 has a wiping unit 36, as shown in FIG. 8. The wiping unit 36 is used for removing deposits (foreign matter) deposited on the nozzle surface 16 of the discharge head 3, and has a stripe-shaped wipe member 37 having a wiping surface 37a facing the nozzle surface 16 of the discharge head 3 and provided so as to allow movement in a relative fashion to the nozzle surface 16, a drive mechanism 38 for causing the wiping surface 37a to move (travel), and a housing member 39 for accommodating the wipe member 37 and the drive mechanism 38. Deposits (foreign matter) deposited on the nozzle surface 16 of the discharge head 3 include droplets D of the functional liquid deposited on the nozzle surface 16.

The wiping unit 36 is provided with a wiping roller 43 for supporting the surface on the side opposite from the wiping surface 37a of the wipe member 37, a pair of tension rollers 44 for adjusting the tension of the wipe member 37 between the feed reel 40 and the wiping roller 43, and a guide roller 45 for guiding the movement (travel) of the wipe member 37 between the take-up reel 41 and the wiping roller 43. The wipe member 37 comprises, e.g., a nonwoven or another material that can absorb liquid.

The drive mechanism 38 comprises the feed reel 40 for feeding the wipe member 37, a take-up reel 41 for taking up the wipe member 37 feed from the feed reel 40, and rotating motor or another actuator 42 for causing the feed reel 40 and the take-up reel 41 to rotate. The feed mechanism 38 configured in this manner is designed to cause the wipe member 37 to move (travel) at a predetermined speed from the feed reel 40 to the take-up reel 41 when the actuator 42 is driven and controlled by the controller 24.

In order for such a wiping unit 36 to wipe the nozzle surface 16 of the discharge head 3, first, the transport device 25 is driven by the controller 24 and the carriage 4 is positioned above the wiping unit 36 of the maintenance device 6. The nozzle surface 16 of the discharge head 3 is made to face an aperture 39a of the housing member 39 of the wiping unit 36, as shown in FIG. 9.

Figure 9:
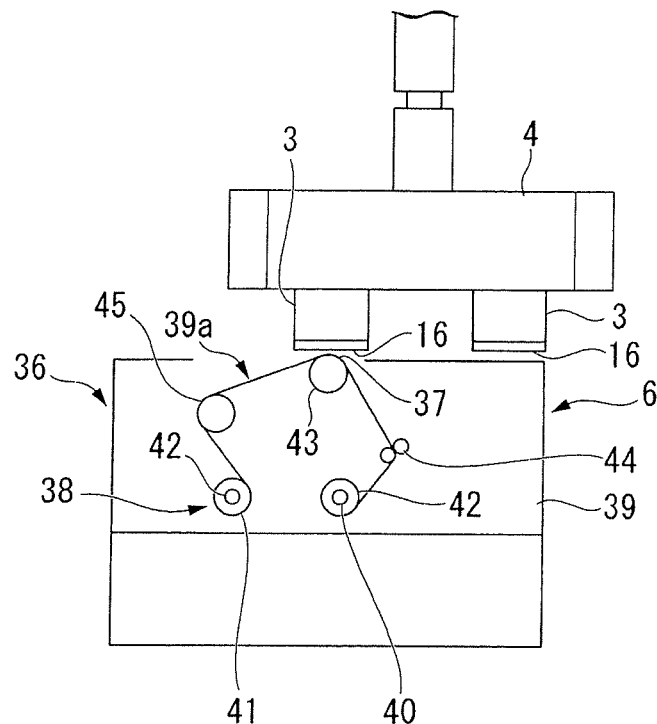
FIG. 9 is a diagram for illustrating the method for using the wiping unit.

Next, the feed reel 40 and the take-up reel 41 are driven by the controller 24, and the wiping surface 37a of the wipe member 37 is caused to moved (travel) above the nozzle surface 16 of the discharge head 3, as shown in FIG. 9. In other words, the nozzle surface 16 of the discharge head 3 is brought into contact with the wiping surface 37a of the wipe member 37 and is made to move (travel) in this state to thereby wipe the nozzle surface 16 with the wipe member 37. Deposits (foreign matter) deposited on the nozzle surface 16 can thereby be wiped away.

Figure 10:
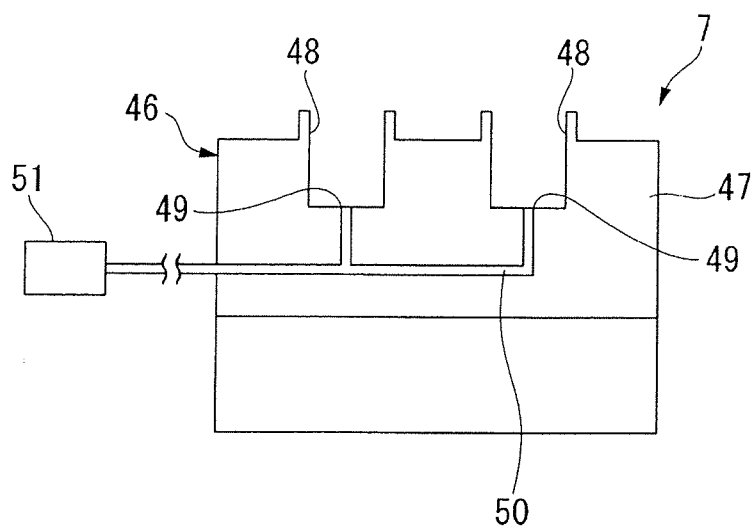
FIG. 10 is a diagram for illustrating the capping unit.

The substrate 7 has a capping unit 46, as shown in FIG. 10. The capping unit 46 is used for mounting a cap 47 so as to cap the nozzle surface 16 of the discharge head 3. The cap 47 has a cap portion 48 composed of a concavity formed in the upper surface facing the discharge head 3. The cap portion 48 is capable of forming a space between the concavity and the nozzle surface 16 of the discharge head 3, and is provided in the same number as the plurality of discharge heads 3, in correspondence to the plurality of discharge heads 3.

The capping unit 46 has a suction port 49 formed on the bottom surface of the cap portion 48 and that is used for suctioning fluid bodies inside the cavity, a flow passage 50 that is in communication with the suction port 49, and a vacuum pump or other suction device 51 connected to the flow passage 50.

The capping unit 46 forms a closed space 52 in the cap portion 48 by fitting the nozzle surface 16 side of the discharge head 3 into the opening of a cap portion (concavity) and bringing the external peripheral surface of the nozzle surface 16 side into contact with the internal peripheral surface of the cap portion (concavity) 48, as shown in FIG. 11.

The nozzle surface 16 of the discharge head 3 is capped by a capping unit 46 of such description, and in order to cause a suction operation to be carried out, first, the transport device 25 is driven by the controller 24, and the carriage 4 is positioned above the capping unit 46 of the maintenance device 6. The nozzle surface 16 of the discharge head 3 is made to face the respective cap portion 48 of the capping unit 46.

Next, the controller 24 causes the elevator mechanism to operate, and the discharge head 3 (carriage 4) is lowered. The nozzle surface 16 of the discharge head 3 is thereby fitted into the opening of the cap portion (concavity) 48 and a closed space 52 is formed in the cap portion 48. Next, the suction device 51 is actuated to perform a suctioning operation and reduce the pressure inside the closed space 52.

At this point, the pressure is reduced inside the closed space 52 in communication with the nozzles 15 of the nozzle surface 16 of discharge head 3, whereby the functional liquid in the cavities 18 and the like of the discharge head 3 is suctioned away via the nozzles 15. Foam inside the cavities 18 is thereby removed prior to discharging, the functional liquid inside the nozzles 15 and other areas which has higher viscosity due to drying is discharged, and functional liquid having suitable viscosity can be fed into the nozzles 15 while maintenance is carried out in the maintenance device 5 (deposit accuracy measurement unit 28) and the maintenance device 6 (wiping unit 36).

As configured herein, when the discharge head 3 is capped in this manner and a suction operation is carried out, the drive signals for micro vibration driving imparted to the discharge head 3 are ordinarily stopped. In other words, micro vibrations are imparted to the discharge head 3 during ordinary discharge standby to prevent the viscosity of the functional liquid from increasing inside the nozzles 15. However, feeding of drive signals for micro vibration driving is stopped in order to cause the functional liquid inside the nozzles 15 and other areas to flow out smoothly during suctioning operation. Therefore, the drive signals for micro vibration driving cause self-heating during ordinary discharge standby, but self-heating does not occur when the suction operation is carried out by the capping unit 46.

The cap portion 48 may be provided with a function (moisture retention function) for reducing drying of the nozzle surface 16 (nozzles 15). Specifically, drying of the nozzle surface 16 is reduced by arranging a damp porous member (mesh member) inside the cap portion 48 and causing the nozzle surface 16 of the discharge head 3 to face the cap portion 48 containing the damp porous material. In other words, drying of the nozzle surface 16 may be reduced by arranging the damp porous member inside the closed space 52 formed by the nozzle surface 16 and the cap portion 48.

A substrate transport device 53 is provided to the side of the stage 2 on the drawing area E1 side in the chamber 8, as shown in FIG. 1. The substrate transport device 53 receives the substrate P on the stage from the stage 2, transports the stage to a substrate storage device 54 arranged in the vicinity of the substrate transport device 53, and stores the substrate in the substrate storage device. The substrate storage device 54 is provided to the sidewall of the chamber 8, and the substrate P stored in the substrate accommodation device 54 can be removed from the exterior of the chamber 8 via an open/close door (not shown) provided to the sidewall.

Air-conditioning devices 55, 56 are provided to the chamber 8, which accommodates the maintenance devices 5, 6, 7, the discharge head 3, the transport device 25, and the like. The air-conditioning device 55 conditions the air of the drawing area E1 inside the chamber 8, is arranged in a position that corresponds to the drawing area E1, on the ceiling of the chamber 8, and provides a down flow of air, as indicated by the broken-line arrows in FIG. 1, at a predetermined temperature in the drawing area E1. The air-conditioning device 56 conditions the air of the maintenance area E2 inside the chamber 8, is arranged in a position that corresponds to the maintenance area E2, on the ceiling of the chamber 8, and provides a down flow of air, as indicated by the broken-line arrows in FIG. 1, at a predetermined temperature in the maintenance area E2.

As configured herein, the air-conditioning device 55 and the air-conditioning device 56 are each independently controlled, and the air-conditioning device 56 in particular is one example of the temperature adjustment unit in the present invention. In other words, the air-conditioning device 56 (temperature adjustment unit) adjusts the temperature of the maintenance area E2, at least while the transport device 25 has the discharge head 3 positioned in the maintenance area E2, so as to be equal to or greater than the temperature of the drawing area E1 while the transport device 25 has the discharge head 3 positioned in the drawing area E1.

In other words, self-heating continues because discharge operations are carried out when the discharge head 3 is positioned in the drawing area E1, and the above-described drive signals for micro vibration driving continue to be fed even when discharged operations are not be carried out. As a result, the temperature of the discharge head 3 is asymptotic to a predetermined temperature after some amount of time has elapsed, and is kept at the same or slightly higher temperature without considerably decreasing from the temperature of the drawing area E1 in which temperature has been adjusted by the air-conditioning device 55. Therefore, the viscosity of the functional liquid substantially does not change.

On the other hand, self-heating does occur in the maintenance area E2 as described above while the discharge head 3 is positioned above the capping unit 46 of the maintenance device 7, for example, and a suctioning operation is being carried out by the capping unit 46. Therefore, conventionally, when some amount of time has elapsed, the temperature of the discharge head 3 considerably decreases from a predetermined temperature, i.e., a suitable temperature when droplets are discharged.

However, in the present embodiment, the temperature of the discharge head 3 is prevented from being considerably less than a predetermined temperature (suitable temperature) because the air-conditioning device 56 adjusts the temperature of the maintenance area E2 to be equal to or greater than the temperature of the drawing area E1.

The control device 23 and the controller 24 are both arranged in the maintenance area E2 as described above, and the drive source 27 of the transport device 25 is also disposed in the maintenance area E2. Therefore, these devices function as a temperature adjustment unit in the present invention, and the heat produced by these devices keeps the temperature of the maintenance area E2 at a predetermined temperature (suitable temperature). The temperature adjustment unit in the present invention preferably comprises all of the substrate storage device 54, the control device 23, the controller 24, and the drive source 27, but may comprise any one of these devices.

In order for the film-forming apparatus 1 having such a configuration to form a color filter on a substrate P, first, the air-conditioning device 55 and the air-conditioning device 56 are actuated with the partition shutter 10 in a closed state, the temperature of the maintenance area E2 and the temperature of the drawing area E1 inside the chamber 8 are adjusted so as to achieve a desired temperature in each area, i.e., so that the temperature of the drawing area E2 is equal to or greater than the temperature of the drawing area E1. Also, apart from the above, the substrate P is set on the stage 2. The discharge head 3 undergoes required maintenance in the maintenance area E2 before functional liquid (color filter material) is discharged from the discharge head 3 to form a film on the substrate P.

Specifically, the nozzle surface 16 of the nozzle surface 16 undergoes a suction operation in the capping unit 46 of the maintenance device 7, the nozzle surface 16 of the discharge head 3 is wiped in the wiping unit 36 of the maintenance device 6, and the deposit accuracy is measured in the deposit accuracy measurement unit 28 of the maintenance device 5. When the deposit accuracy (discharge accuracy) of the discharge head 3 is confirmed to be normal, the discharge head 3 is moved by the transport device 25 to the drawing area E1.

Next, the discharge head 3 is positioned above the substrate P, in which state the discharge operation is carried out in a conventional manner, and droplets D are disposed on the substrate P. A color filter (thin film) is thereby formed on the substrate P. When discharge operations are carried out in this manner, the control device 23 for controlling the discharge operations self-heats and the maintenance area E2 is heated thereby. The controller 24 connected to the control device 23 also self-heats in a similar fashion and heats the maintenance area E2.

When a color filter (thin film) is formed on the substrate P in this manner and then a thin film is formed on predetermined number of substrates P, the discharge head 3 is moved by the transport device 25 to the maintenance area E2 while the partition shutter 10 is opened and closed in order to repeat maintenance. Maintenance is again carried out by the maintenance devices 5, 6, 7 as required. At this point, the discharge head 3 does not self-heat during this interval because the drive signals (micro vibration voltage waveforms) for micro vibration driving are not fed to the discharge head 3 as described above in the particular case that capping is carried out in the maintenance device 7. Therefore, the self-heating of the discharge head 3 is stopped, whereby the temperature of the discharge head decreases in accordance with a conventional configuration.

However, in the present embodiment, the temperature of the maintenance area E2 is adjusted by the air-conditioning device 56 to be equal to or greater than the temperature of the drawing area E1. Also, the control device 23, the controller 24, and the drive source 27 are arranged in the maintenance area E2, and the maintenance area E2 is heated by the heat produced by these devices. Therefore, a desired temperature set in advance, i.e., a suitable temperature for carrying out discharges to form a thin film can be maintained without a substantial temperature reduction when the discharge head 3 undergoes maintenance.

Thereafter, the discharge head 3 is again returned to the drawing area E1, and functional liquid (color filter material) is discharged as described above onto the substrate P on the stage 2 to form a thin film (color filter). At this time, discharge variability caused by temperature change does not occur because the temperature of the discharge head 3 is kept at a desired temperature, even when the discharge head 3 is moved from the maintenance area E2 to the drawing area and discharging is carried out immediately in such a state without waiting.

In similar fashion, the discharge head can be moved from the maintenance area E2 to the drawing area and discharging can be immediately carried out in this manner without waiting in such a state even at the start of a new operation after the apparatus operation has been stopped for a long period of time.

Therefore, in accordance with the film-forming apparatus 1 and the method for forming a film using the film-forming apparatus 1 according to the present invention, discharge variability caused by temperature change of the discharge head 3 can be prevented without leading to a loss of productivity due to a required wait time following maintenance, and good discharging operation can be carried out by the discharge head 3 to form a color filter or the like.

Since the partition shutter 10 is openably/closeably provided between the drawing area E1 and the maintenance area E2, the temperature of the maintenance area E2 in particular is readily adjusted to and kept at a desired temperature by the air-conditioning device 56 or other temperature adjustment unit.

Also, since the control device 23, the controller 24, and the drive source 27 are made to additionally function as a temperature adjustment unit, energy can be saved by making efficient use (reuse) of heat produced from the control device 23, the controller 24, and the drive source 27.

The present invention is not limited to the embodiment described above; various modifications can be made within a range that does not depart from the spirit of the present invention. For example, in the present embodiment, the drawing area E1 and the maintenance area E2 are partitioned by a partition shutter 10, but in the particular case that the maintenance area E2 and the drawing area E1 are to be adjusted to the same temperature, the temperature of the maintenance area E2 may be brought to the same temperature as the drawing area E1 using an air-conditioning device or other temperature adjustment unit without providing the partition shutter 10. In such a case, the air-conditioning device 55 and the air-conditioning device 56 may be identically controlled using a shared control mechanism without the use of independent control.

The configuration of the stage 2, the configuration of the transport device 25 of the discharge head 3, the configuration of the maintenance devices 5, 6, 7, and the like are not limited to the embodiment described above, and various configurations can be used.

In the present embodiment, the case of a thin film for a color filter was described, but the film-forming apparatus and the method for forming a film of the present invention are not limited to the formation of a color filter; other suitable applications related to the formation of a functional film in an organic EL device, an alignment film in a liquid crystal device, a wiring pattern, and various other thin films.

What is claimed is:

1. A film-forming apparatus comprising:
    a stage for mounting a substrate;
    a discharge head having a nozzle surface provided with a plurality of nozzles and configured and arranged to discharge droplets of a functional liquid from nozzles of the nozzle surface;
    a maintenance device configured and arranged to perform maintenance of the discharge head; and
    a chamber accommodating the stage, the discharge head, and the maintenance device, with the chamber including a drawing area, in which the stage is arranged, a maintenance area, in which the maintenance device is arranged, and a transport device configured and arranged to move the discharge head between the drawing area and the maintenance area inside the chamber, and
    a temperature adjustment unit provided to the chamber and configured and arranged to adjust the temperature of the maintenance area at least while the transport device has the discharge head positioned in the maintenance area to be equal to or greater than the temperature of the drawing area while the transport device has the discharge head positioned in the drawing area.

2. The film-forming apparatus according to claim 1, further comprising
    a partition shutter openably/closeably disposed between the drawing area and the maintenance area.

3. The film-forming apparatus according to claim 1, wherein,
    the temperature adjustment unit includes an air-conditioning device provided to the chamber.

4. The film-forming apparatus according to claim 1, wherein
    the temperature adjustment unit includes a control device arranged in the maintenance area and configured and arranged to control driving of the discharge head.

5. The film-forming apparatus according to claim 1, wherein
    the temperature adjustment unit includes a drive source of the transport device arranged in the maintenance area.

6. The film-forming apparatus according to claim 1, wherein
    the maintenance device includes a capping unit configured and arranged to mount a cap on the nozzle surface of the discharge head.

7. A film-forming apparatus comprising:
    a discharge head configured and arranged to discharge droplets of a functional liquid from nozzles;
    a maintenance device configured and arranged to perform maintenance of the discharge head;
    a chamber having a drawing area, in which the discharge head discharges droplets on a substrate, and a maintenance area, in which the maintenance device performs maintenance of the discharge head;
    a temperature adjustment unit configured and arranged to adjust the temperature inside the chamber; and
    a transport device configured and arranged to move the discharge head between the drawing area and the maintenance area,
    the temperature adjustment unit being configured and arranged to adjust the temperature of the maintenance area while the transport device has the discharge head positioned in the maintenance area to be equal to or greater than the temperature of the drawing area while die transport device has the discharge head positioned in the drawing area.

8. A method of forming a film comprising:
    discharging droplets of a functional liquid from nozzles of a nozzle surface of a discharge head onto a substrate to form a film on the substrate in a drawing area inside of a chamber;
    performing maintenance of the discharge head by a maintenance device in a maintenance area inside the chamber;
    moving the discharge head between the drawing area and the maintenance area by a transport device; and
    adjusting the temperature of the maintenance area at least in the period when the transport device has the discharge head positioned in the maintenance area to be equal to or greater than the temperature of the drawing area while the transport device has the discharge head positioned in the drawing area.

* * * * *